United States Patent
Inomata et al.

(10) Patent No.: US 6,205,014 B1
(45) Date of Patent: Mar. 20, 2001

(54) MULTILAYER CERAMIC CAPACITOR

(75) Inventors: Yasuyuki Inomata; Yoshikazu Okino, both of Tokyo (JP)

(73) Assignee: Taiyo Yudan Co., Ltd., Tokyo (JP)

( * ) Notice: Subject to any disclaimer, the term of this patent is extended or adjusted under 35 U.S.C. 154(b) by 0 days.

(21) Appl. No.: 09/293,950

(22) Filed: Apr. 19, 1999

(30) Foreign Application Priority Data

May 1, 1998 (JP) .................................................. 10-121997

(51) Int. Cl.⁷ .............................. H01G 4/20; H01G 4/06
(52) U.S. Cl. ...................................... 361/312; 361/321.2
(58) Field of Search ........................ 361/306.3, 311–313, 361/320, 321.1–321.5, 322; 501/134–139

(56) References Cited

U.S. PATENT DOCUMENTS 5,134,540 * 7/1992 Rutt .................................... 361/321.4
5,234,641 * 8/1993 Rutt ....................................... 264/61

* cited by examiner

*Primary Examiner*—Anthony Dinkins
(74) *Attorney, Agent, or Firm*—Snider & Associates; Ronald R. Snider

(57) ABSTRACT

The multilayer ceramic capacitor has a plurality of dielectric layers and inner layers laminated alternately laminated on one another. In each of the dielectric layers, the rate of ceramic grain which form the dielectric layers and present singly in one dielectric layer over its entire longitudinal thickness is set to amount to 20% or more. The multilayer ceramic capacitor can prevent a decrease in a CR product to a value lower than a desired level even if the dielectric layer becomes as thin as 5 μm or less. This can comply with demands for a multilayer ceramic capacitor that the number of the dielectric layers to be laminated on the inner electrodes should be increased yet the thickness of the dielectric layers should be made thinner in order to meet requirements for making electronic circuit more compact in size and higher in density.

6 Claims, 1 Drawing Sheet

MULTILAYER CERAMIC CAPACITOR

CROSS-REFERENCE

This application claims the priority of Japanese Patent Application No. H10-121,997, filed on May 1, 1998, which is incorporated herein by reference in its entirety.

BACKGROUND OF THE INVENTION

1. Field of the Invention

The present invention relates to a multilayer ceramic capacitor which has a large number of laminated layers of dielectric layers and inner electrodes, whose dielectric layers are each set to be thin, and which is compact in size yet large in capacitance.

2. Description of the Related Art

A multilayer ceramic capacitor is composed of a chip-shaped element assembly and a pair of outer electrodes which are formed at both end portions of the element assembly. The element assembly is in turn composed of a number of laminated layers in which a number of dielectric layers and inner electrodes are alternately laminated on one another. The inner electrodes are configured such that the adjacent electrodes are disposed so as to face each other with the dielectric layer between and to electrically connect them individually to the outer electrodes.

The element assembly may be produced by laminating ceramic green sheets and conductive patterns alternately on one another to form a laminated assembly in a chip shape and firing the chip-shaped laminated assembly at a high temperature in the range of approximately 1,200° C. to 1,300° C. in air.

The ceramic green sheet to be used for conventional laminated ceramic capacitors is composed of ceramic grain of, e.g., $BaTiO_3$ type, etc., which has a high dielectric constant, and an organic binder as main components. On the other hand, the conductive pattern may be composed of a conductive paste containing powders of, e.g., Pd or the like as a main component.

The component such as Pd or the like to be used for the main component of the conductive paste is a noble metal which is expensive. Therefore, conventional multilayer ceramic capacitors are expensive in production costs. Recently, a base metal such as Ni or the like has been used as the main component for the conductive paste in order to reduce production costs of ceramic capacitors.

However, the use of the base metal such as Ni, etc., as the main component of the conductive paste for the production of chip-shaped laminated assembly may suffer from the disadvantages that the such base metal is caused to undergo oxidation, when it is burned at high temperature in air in a conventional way, and as a result that the conductivity of the inner electrodes may be lost. On the other hand, when the chip-shaped laminated assembly is burned at high temperature in a non-oxidative atmosphere in order for the base metal such as Ni or the like to fail to undergo oxidation, the dielectric layers are caused to be reduced, thereby lowering resistance to insulation and as a consequence failing to gain a desired level of electrical characteristics.

Therefore, when the base metal such as, e.g., Ni or the like is used as a material for the inner electrode, a desired level of electrical characteristics is designed to be achieved by using a material having a high degree of resistance to reduction for the dielectric layer. In this case, the firing is first carried out in a reductive atmosphere and the thermal treatment is then carried out at temperature lower than the firing temperature, i.e. at approximately 600° C. to 900° C., in an atmosphere containing a small amount of oxygen to re-oxidize the dielectric layer and recover the resistance to insulation of the dielectric layer, while preventing the inner electrode from undergoing oxidation.

Recently, there are growing demands to make multilayer ceramic capacitors compact in size and larger in capacitance in order to comply with requirements for electric circuits which have smaller in size yet higher in density. Therefore, attempts have been made to further increase a number of laminated dielectric layers and make them thinner, in order to meet such requirements for making the multilayer ceramic capacitor compact in size and larger in capacitance.

It has to be noted, however, that the further increase of the number of the multilayer dielectric layers and the thinning of them can improve a capacitance of the resulting multilayer ceramic capacitor, but they may cause a decrease in resistance to insulation of the resulting multilayer ceramic capacitor. The reason for the decrease in resistance to insulation is because the insulation resistance R can be represented by $R=(\rho \times d)/S$, where R is resistance, $\rho$ is resistivity, S is the area of the electrode, and d is the thickness of the dielectric layer.

Further, a CR product can be enumerated as one item for characteristics of a capacitor. The CR product is the product obtained by multiplying the capacitance C by the insulation resistance R. Thus, as the capacitance C can be represented as $C=\epsilon_0 \times \epsilon_r \times S/d$, wherein $\epsilon_0$ is a dielectric constant in vacuo; and $\epsilon_r$ is a specific dielectric constant, the CR product can be represented by $C \times R = \rho \times \epsilon_0 \times \epsilon_r$. As a result, it can be found that the CR product can give a value that does not depend upon the thickness of the dielectric layer and the number of the layers thereof.

It should be noted, however, that, generally speaking, the CR product shows the tendency that it may decrease when the thickness of the dielectric layer becomes thinner than 5 $\mu$m. This is considered to occur because the resistance to insulation is caused to deviate from the ohmic rule as the dielectric layer becomes thinner. In other words, ceramic capacitors may cause the problem that the CR product may be reduced as the ceramic capacitor becomes thinner.

SUMMARY OF THE INVENTION

Therefore, the present invention has an object to provide a multilayer ceramic capacitor which is compact in size and is provided with a high capacitance and which produces a desired level of the CR product, even if a dielectric layer is made thinner.

In order to achieve the object, the present invention provides a multilayer ceramic capacitor having a number of dielectric layers and inner electrodes laminated alternately on one another, in which a rate of single ceramic grain present in one dielectric layer amounts to 20% or higher.

The other objects, features and advantages of the present invention will become apparent in the course of the description of this application with reference to the accompanying drawings.

DESCRIPTION OF THE PREFERRED EMBODIMENTS

Figure 1:
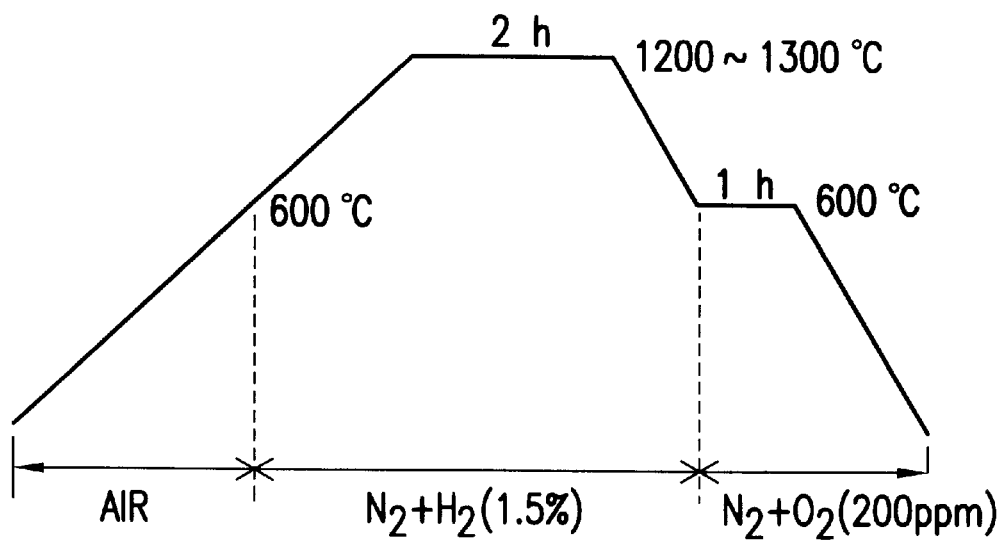
FIG. 1 is a graph showing an example of a firing pattern of a multilayer ceramic capacitor according to an embodiment of the present invention.

The multilayer ceramic capacitor according to the present invention comprises a large number of laminated layers of dielectric layers and inner electrodes, which are laminated alternately, whose dielectric layers are each set to be thin, and which is compact in size yet large in capacitance.

In the multilayer ceramic capacitor according to the present invention, each of the dielectric layers is configured such that single ceramic grain present in one dielectric layer at a rate of 20% or more.

The dielectric layer may be produced from a material of, for example, a $BaTiO_3$ type, although a material other than the $BaTiO_3$ type material can also be used.

Further, each of the dielectric layers may preferably have a layer thickness in the range of 5 $\mu$m or thinner, although it may have a layer thickness of thicker than 5 $\mu$m. Moreover, the ceramic grain may preferably have a mean grain size of 3.5 $\mu$m or larger, although the grain sizes of the ceramics depend upon the thickness of the dielectric layer. If the thickness of the dielectric layer is thicker than 5 $\mu$m, the CR product of the resulting multilayer ceramic capacitor may be decreased to a remarkable extent.

The inner electrode may be produced by firing a conductive paste containing Ni powders as a major component, although it may be produced from a conductive paste containing a base metal other than Ni as a major component.

The rate of the single ceramic grain present in one dielectric layer, as referred to in this description, can be determined, for instance, by cutting the multilayer ceramic capacitor along the longitudinal plane perpendicular to the inner electrodes and measuring the grain sizes of the ceramics present in the dielectric layers appearing in the cut section. The mean grain size of the ceramics is then calculated. Further, a predetermined number of lines are drawn in the longitudinal direction perpendicular to the inner electrodes over the entire sectional area of the multilayer ceramic capacitor each at an interval of the mean grain size. Moreover, the number of the lines are counted which cross each a single ceramic grain present in one dielectric layer, which is located singly over its entire longitudinal region of the dielectric layer in the position where the line is crossing. Thereafter, the rate in percentage of the such single ceramic grain that are present singly in one dielectric layer in the direction perpendicular to the inner electrodes is calculated by dividing the lines passing through the such single ceramic grain by all the predetermined number of the lines drawn longitudinally and perpendicularly to the inner electrodes and then by multiplying the resulting quotient by 100.

The present invention will be described in more detail by way of examples with reference to the accompanying drawings.

EXAMPLE

A ceramic green sheet was prepared in a conventional way and a conductive pattern was printed on the resulting ceramic green sheet. A plural number of the ceramic green sheets so prepared are laminated on one another and pressed into a laminated sheet. The resulting laminated sheet was cut into chip-shaped pieces so as for each to contain the conductive pattern.

In this example, the ceramic green sheet was prepared from ceramic powders of $BaTiO_3$ type. The conductive pattern was formed by using a conductive paste containing Ni powders as a major component. Further, the ceramic green sheet was prepared so as to be as thick as 5 $\mu$m after firing.

As shown in FIG. 1, the chip-shaped laminated members were heated in air by raising the temperature of a furnace up to 600° C. to burn out the binder, followed by turning the atmosphere of the furnace into a non-oxidative atmosphere consisting of nitrogen gas containing 2.0% by volume of $H_2$ and elevating the temperature to 1,200° C. to 1,300° C. Further, they were fired at the same temperature for 1 to 5 hours, and the temperature of the furnace was lowered to 600° C. Then, the non-oxidative atmosphere of the furnace was changed into a nitrogen-gas atmosphere containing 200 ppm of oxygen, and they were heated at 600° C. for another 1 hour to re-oxidize the dielectric layers. Thereafter, the temperature of the furnace was allowed to cool to ambient temperature. The grain sizes were changed by varying the firing temperature and residence time.

Then, the resulting laminated members were polished after firing, followed by heating them at 1,150° C. to 1,200° C. to subject them to thermal etching. An SEM image of the polished surface was taken at the 2,000-fold magnification. On the other hand, the grain sizes of 200 grain were determined by measuring the diameter of each of the grain, which extends in the direction parallel to the inner electrodes. Then, the mean grain size of the 200, grain was calculated. The results are shown in Table below.

Figure 2:
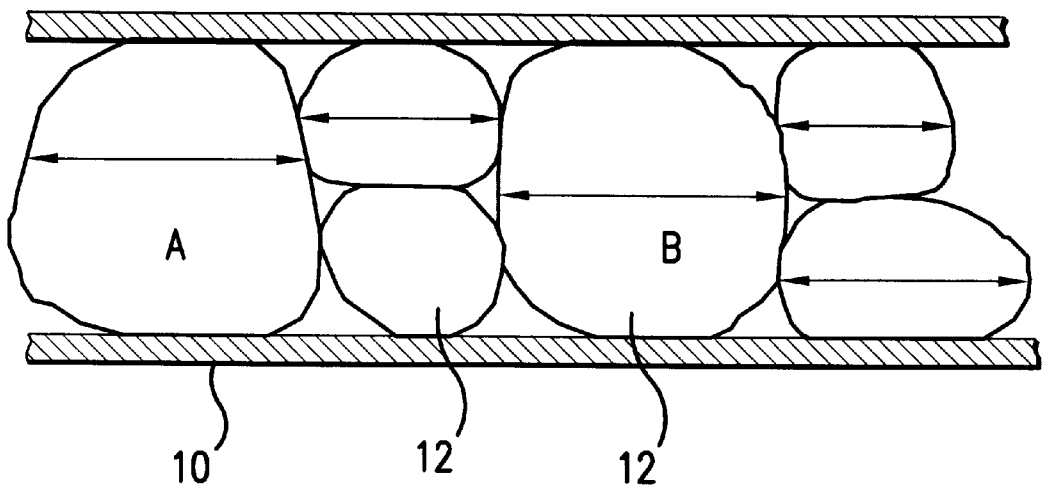
FIG. 2 is a schematic illustration showing a sequence of ceramic grain in a section of a dielectric layer of the multilayer ceramic capacitor according to the embodiment of the present invention.

On the other hand, 100 lines were drawn longitudinally each at the interval equal to the mean grain size calculated above on the above microscopic picture in the direction perpendicular to the inner electrodes. The number of the lines were then counted on the microscopic picture, each of which crosses only one single grain present in one dielectric layer over its entire length of the line. The such lines crossing the such single grain were further divided by the 100 lines as originally drawn, and represented by percentage as a rate of single grain present in one layer. More specifically, the "single grain present in one layer" referred to herein indicate single grain A and B each of which is present singly in one dielectric layer 12 interposed between inner electrodes 10 and 10, as shown as grain "A" and "B" in FIG. 2, respectively.

Then, the chip so prepared was burned to sinter it, and the resulting laminated member was provided with outer electrodes at its both ends by baking to form a multilayer ceramic capacitor. The multilayer ceramic capacitor was then measured for capacitance with an LCR meter by placing it at 20° C. in a chamber. The measurement was carried out under conditions at 1 kHz and 1 Vrms. After measurement of the capacitance, the insulation resistance was measured by applying DC 50 volts to the multilayer ceramic capacitor for 1 minute. The capacitance and the insulation resistance were multiplied to give a CR product as represented in $\mu F \cdot M\Omega$. The results are shown in Table below.

TABLE

| SAMPLE NOS. | MEAN PARTICLE SIZE ($\mu$m) OF CERAMIC GRAIN | RATE OF SINGLE GRAIN PRESENT IN ONE LAYER (%) | CR PRODUCT ($\mu F \cdot M\Omega$) |
| --- | --- | --- | --- |
| 1 | 1.2 | 0 | 3,000 |
| 2 | 2.0 | 0 | 3,200 |
| 3 | 2.9 | 3 | 6,000 |
| 4 | 3.2 | 10 | 8,500 |
| 5 | 3.5 | 20 | 15,000 |
| 6 | 3.5 | 35 | 15,500 |
| 7 | 3.5 | 45 | 16,800 |
| 8 | 4.0 | 53 | 18,700 |
| 9 | 4.2 | 60 | 20,000 |
| 10 | 5.0 | 100 | 17,000 |

From Table above, it can be found that a CR product of 15,000 $\mu F \cdot M\Omega$ or higher can be achieved when the rate of single grain present in one layer amounts to 20% or higher.

EFFECTS OF THE INVENTION

For the multilayer ceramic capacitor according to the present invention, the reductive property can be suppressed at the stage of firing because the surface area of the ceramic grain with the dielectric layers formed thereon becomes small. Further, the thinning of the thickness of the multilayer ceramic capacitor can further make it likely to disperse oxygen in the grain boundary with ease after the oxygen has dispersed the interface between the inner electrodes and the ceramic grain at the stage of re-oxidation. Therefore, it is considered that the ohmic resistance characteristics can be maintained. In other words, making the thickness of the multilayer ceramic capacitor thinner can realize these features more effectively.

With these features, the present invention can achieve the effect that the multilayer ceramic capacitor can be provided with a large amount of capacitance, even if the dielectric layer is thin, without causing a decrease in the CR product even in a region where the CR product is otherwise caused to decrease in usual circumstances, although it can be made compact in size.

What is claimed is:

1. A multilayer ceramic capacitor having a plurality of dielectric layers and inner electrodes laminated alternately on one another, wherein a rate of single ceramic grain present in one dielectric layer amounts to 20% or higher, said single ceramic grain being a ceramic grain each of which is located singly in one dielectric layer over an entire longitudinal length of said one dielectric layer.

2. The multilayer ceramic capacitor as claimed in claim 1, wherein:

said dielectric layer is as thin as 5 $\mu$m or less, and said ceramic grain forming said dielectric layer has a mean grain size of 3.5 $\mu$m or larger.

3. The multilayer ceramic capacitor as claimed in claim 1, wherein said inner electrode is formed by a conductive paste containing Ni powders as a major component.

4. The multilayer ceramic capacitor as claimed in claim 1, wherein said dielectric layer comprises ceramic grain of a BaTiO4 type.

5. The multilayer ceramic capacitor as claimed in claim 2, wherein said inner electrode is formed by a conductive paste containing Ni powders as a major component.

6. The multilayer ceramic capacitor as claimed in claim 2, wherein said dielectric layer comprises ceramic grain of a BaTiO4 type.

* * * * *